United States Patent
So

(10) Patent No.: US 9,277,628 B2
(45) Date of Patent: Mar. 1, 2016

(54) METHOD FOR ADJUSTABLY CONTROLLING LIGHT AND APPARATUS THEREOF

(71) Applicant: Yu-sheng So, New Taipei (TW)

(72) Inventor: Yu-sheng So, New Taipei (TW)

( * ) Notice: Subject to any disclaimer, the term of this patent is extended or adjusted under 35 U.S.C. 154(b) by 56 days.

(21) Appl. No.: 14/085,595

(22) Filed: Nov. 20, 2013

(65) Prior Publication Data

US 2014/0159588 A1  Jun. 12, 2014

(30) Foreign Application Priority Data

Dec. 6, 2012  (TW) .............................. 101145847 A

(51) Int. Cl.
*H05B 37/02* (2006.01)
(52) U.S. Cl.
CPC .......... *H05B 37/0218* (2013.01); *H05B 37/029* (2013.01); *H05B 37/0272* (2013.01); *Y02B 20/46* (2013.01)
(58) Field of Classification Search
USPC .......... 315/209 R, 224, 247, 185 S, 307–326; 345/82, 102, 204, 211–214
See application file for complete search history.

(56) References Cited

U.S. PATENT DOCUMENTS

| 5,210,860 A | * | 5/1993 | Pfeffer | ................. G06F 3/0601 714/42 |
| 2007/0146168 A1 | | 6/2007 | Barnhart et al. | |

FOREIGN PATENT DOCUMENTS

| EP | 2320710 A1 | 5/2011 |
| EP | 2390563 A2 | 11/2011 |
| GB | 2429855 | 3/2007 |
| JP | H0611298 U | 2/1994 |
| JP | 2009230949 A | 10/2009 |
| WO | WO2004057927 A1 | 7/2004 |
| WO | WO2011162569 A2 | 12/2011 |
| WO | WO2012090122 A1 | 7/2012 |

* cited by examiner

*Primary Examiner* — Tuyet Vo
(74) *Attorney, Agent, or Firm* — Muncy, Geissler, Olds & Lowe, P.C.

(57) ABSTRACT

Disclosed is a method for adjustably controlling a light by concurrently tracking and controlling one or more lighting devices and apparatus thereof. The light device is connected to a control unit and is provided with at least one power switch. The control unit is provided for recognizing a switch operating code and for performing an adjustable controlling or an operating of each lighting device. Therefore, the present invention can provide more convenience and completeness of lighting configuration.

20 Claims, 9 Drawing Sheets

METHOD FOR ADJUSTABLY CONTROLLING LIGHT AND APPARATUS THEREOF

FIELD OF THE INVENTION

The present invention relates to a method for adjustably controlling a light and an apparatus thereof, and more particularly, to a method for adjustably controlling a light by concurrently tracking and controlling one or more lighting devices according to a preconfigured lighting feature parameter and an apparatus thereof.

BACKGROUND OF THE INVENTION

A technology of lighting is for lighting a specific environment or a place by use of various lighting devices. The conventional lighting technology, in which a fluorescent lamp is mostly well-known, employs a gas-discharge lamp that generates a light by discharging electricity through an ionized gas. The mainstream of the current lighting technology applies a light emitting diode (LED) as a light source. A LED is manufactured as a LED light in form of a lamp, a light bulb, a light panel and the like to be widely used for indoor lighting and outdoor lighting.

In a prior art, in addition to a turn on and a turn off operations, if a function of adjustable controlling a light device is desired, it is necessary to modify the conventional power switch to a complicated power controller, or to modify a light device to connect with a central computer for controlling operation. However, these modifications are not only expensive in the installation but the user usually can not get used to the complicated control for the controller as compared with the conventional operation. Moreover, the conventional adjustably controlling effect is not as perfect as desired, so that a user's requirement can not be met.

SUMMARY OF THE INVENTION

Therefore, the present invention has been made in view of the above circumstances and provides a method for adjustably controlling a light by concurrently tracking and controlling one or more lighting devices and an apparatus thereof to solve the problem existed in the prior art.

A method for adjustably controlling a light by concurrently tracking and controlling one or more lighting devices to which a control unit is connected and by which at least one power switch is provided, wherein the control unit is provided with one or more predetermined lighting feature parameters, the method comprises: (a) a step of concurrently controlling a lighting device for concurrently controlling and operating each lighting device, when a power is applied, based on an alternating current frequency of the applied power or an alternating current cycle period of the applied power, and for concurrently controlling and operating each lighting device, when the power is not applied, based on a whole complete alternating current cycle period that is obtained prior to the applied power being off; (b) a step of initializing coding for initializing coding from a time point on which an initial operation of the power switch is started after the power switch has not been operated continuously for a predetermined continuous non-operating time period; (c) a step of ending coding for recognizing a combination of switching operations within a time period of switching operations as a switch operating code, wherein the time period of switching operations is calculated starting from the time point on which an initial operation of the power switch is started to a time point on which the power switch is continuously not operated for a time period longer than the predetermined continuous non-operating time period; (d) a step of corresponding operation for performing, by means of the control unit, an adjustable controlling mode or a lighting device operating mode based on the switch operating code; (e) a step of adjustably controlling lighting device for determining a lighting feature parameter of the lighting device and updating the predetermined lighting feature parameter of the control unit by use of the predetermined lighting feature parameter when it is operated in the adjustable controlling mode of the lighting device, wherein the lighting feature parameter includes a brightness feature parameter or a color temperature feature parameter; and (f) a step of operating lighting device for executing, by means of the control unit, an lighting device operating procedure according to the predetermined lighting feature parameter when it is operated in the lighting device operating mode, wherein the lighting device operating procedure includes a light turning-on procedure and a light turning-off procedure.

According to an embodiment of the present invention, the step (a) further includes a step of determining a rated alternating current frequency of the applied power in such a way that the adjustable controlling and operating of each lighting device is adjusted in accordance with the rated alternating current frequency of the applied power.

According to an embodiment of the present invention, in the step (a), the whole complete alternating current cycle period is obtained from an average period or a modal period of the plural alternating current cycle period of the power device in a time point prior to the applied power being off.

According to an embodiment of the present invention, in the step (c), the combination of switching operations within the time period of switching operations is a combination of items selected from a group including a switching frequency, a switching interval time, and a switching duty cycle.

According to an embodiment of the present invention, the step (e) further includes a step of recognizing, by means of the control unit, a combination of the switching operations of the power switch within another time period of switching operation as another switch operating code, and performing a corresponding adjustable controlling operation according to another switch operating code.

According to an embodiment of the present invention, in the step (e), the lighting feature parameter includes a startup feature parameter.

According to an embodiment of the present invention, the step (e) includes a step of configuring, by means of the control unit, the lighting feature parameter of the lighting device to a factory defaulted feature parameter to thus restoring the predetermined lighting parameter to the factory defaulted feature parameter.

According to an embodiment of the present invention, the step (e) further includes a step of updating a predetermined lighting feature parameter of a new lighting device in accordance with the currently predetermined lighting feature parameter of the lighting device.

According to an embodiment of the present invention, in the step (e) the step of updating the predetermined lighting feature parameter of a new lighting device includes the steps of: controlling the lighting device to perform a flashing effect according to the currently predetermined lighting feature parameter; sensing, by means of a light sensor of the new lighting device, the flashing effect in such a manner that a flashing operation code is recognized by a control unit of the new light device; and configuring, by means of the control unit of the new lighting device, the predetermined lighting feature parameter of the new lighting device according to the flashing operation code.

According to an embodiment of the present invention, in the step (e) of updating a predetermined lighting feature parameter of a new lighting device includes the steps of: controlling the lighting device to perform a flashing effect according to the currently predetermined lighting feature parameter; sensing, by means of a light remote controlling device, the flashing effect in such a manner that a light signal containing the flashing effect is transmitted to the new lighting device; sensing, by means of a light sensor of the new lighting device, the light signal in such a manner that a flashing operation code is recognized by a control unit of the new lighting device; and configuring the predetermined lighting feature parameter of the new lighting device according to the flashing operation code.

According to an embodiment of the present invention, at least one step between the step (d) and the step (e) further includes: controlling, by means of the control unit, the lighting device to perform different flashing effects according to the different adjustable controlling mode for the light device, wherein the flashing effect includes a twinkle flash within a predetermined time period, a predetermined times for a twinkle flash, a gradual brightness and a gradual darkness.

According to an embodiment of the present invention, at least one step between the step (d) and the step (e) further includes: controlling, by means of the control unit, a sound playing unit to perform different sound effects according to different adjustable controlling modes.

According to an embodiment of the present invention, the step (f) further includes a step of enabling the lighting device operating procedure to be an automatically brightness adjusting procedure, wherein the automatically brightness adjusting procedure is for adjusting a light output of the lighting device in accordance with a brightness difference obtained by a control unit by which a brightness defined by a reference brightness sensing feature parameter of the predetermined lighting feature parameter and an outside space sensed by a light sensor are compared so as enable an illuminating intensity of a covering space of the lighting device to be within a range of predetermined illuminating intensity.

According to an embodiment of the present invention, the step (f) further includes a step of enabling the lighting device operating procedure to be an automatically lighting turning on/off procedure, wherein the automatic lighting turning on/off procedure is for enabling the control unit to control the lighting device to be turned on or turned off when a outside space sensed by a light sensor is within a range defined by an automatically turning on/off brightness parameter of the predetermined lighting feature parameter.

An apparatus for adjustably controlling a light by concurrently tracking and controlling one or more lighting devices, wherein each lighting device is concurrently controlled and operated by means of an alternating current frequency of a applied power or an alternating current cycle period of a applied power when the power is applied, and is concurrently controlled and operated by means of a whole complete alternating current cycle period that is obtained prior to the applied power being off when the power is not applied, the apparatus comprises: a lighting device; at least one control unit connected with the lighting device, the control unit being operated in one or more adjustably controlling modes and one or more lighting device operating modes, and being provided with one or more predetermined lighting feature parameters; and at least one power switch connected between the control unit and the applied power unit; wherein the control unit determines an initializing coding operation starting from a time point on which an initial operation is started after the power switch has not been operated continuously for a predetermined continuous non-operating time period and recognizes a combination of switching operations within a time period of switching operations as a switch operating code, wherein the time period of switching operations is calculated starting from the time point on which an initial operation of the power switch is started to a time point on which the power switch is continuously not operated for a time period longer than the predetermined continuous non-operating time period, and performs the adjustable controlling mode or the lighting device operating mode of a corresponding operation to a lighting device based on the coding of the power operation; wherein when it is operated in the adjustable controlling mode of the lighting device, the control unit determines a lighting feature parameter of the lighting device and updates the predetermined lighting feature parameter of the control unit by use of the predetermined lighting feature parameter, in which the lighting feature parameter includes a brightness feature parameter or a color temperature feature parameter; and wherein when it is operated in the lighting device operating mode of the lighting device, the control unit controls the lighting device to execute a lighting device operating procedure according to the predetermined lighting feature parameter, in which the lighting device operating procedure includes a light turning-on procedure and a light turning-off procedure.

According to an embodiment of the present invention, the control unit is further installed with a factory defaulted feature parameter as the predetermined lighting feature parameter.

According to an embodiment of the present invention, it further includes a light sensor for sensing an outside space, wherein the light sensor is provided as being proximal to the lighting device and is connected with the control unit.

According to an embodiment of the present invention, the control unit further includes a light communicating module, for communicating with an external device by utilizing a combination of a flashing effect from the outside space sensed by the light sensor and by controlling the lighting device to perform the flashing effect.

According to an embodiment of the present invention, it further includes a light remote controlling device provided with a light emitting element, a light sensing element, and a memory element, wherein the light emitting element emits a light signal containing a combination of a predetermined flashing effect to the light sensing element, and the light sensing element senses the combination of a flashing effect of the lighting device to remotely control the lighting device.

According to an embodiment of the present invention, the light remote controlling device further includes a memory means provided with a transferring storing unit and an individually storing unit.

According to an embodiment of the present invention, the light remote controlling device is a mobile electronic device.

According to an embodiment of the present invention, the control unit further includes a parameter backup unit.

According to an embodiment of the present invention, the control unit further includes an operation guiding module, for controlling the lighting device to perform different flashing effects according to the configuration in the adjustable controlling mode, wherein the flashing effect includes a twinkle flash within a predetermined time period, a predetermined times for a twinkle flash, a gradual brightness and a gradual darkness.

According to an embodiment of the present invention, it further includes a sound playing unit connected with the control unit, wherein the control unit controls the sound playing unit to perform different sound effects according to different configuration in the adjustable controlling modes.

BRIEF DESCRIPTION OF THE DRAWINGS

The structure and the technical means adopted by the present invention to achieve the above and other objectives can be best understood by referring to the following detailed description of the preferred embodiments and the accompanying drawings.

DETAILED DESCRIPTION OF THE PREFERRED EMBODIMENTS

Figure 1:
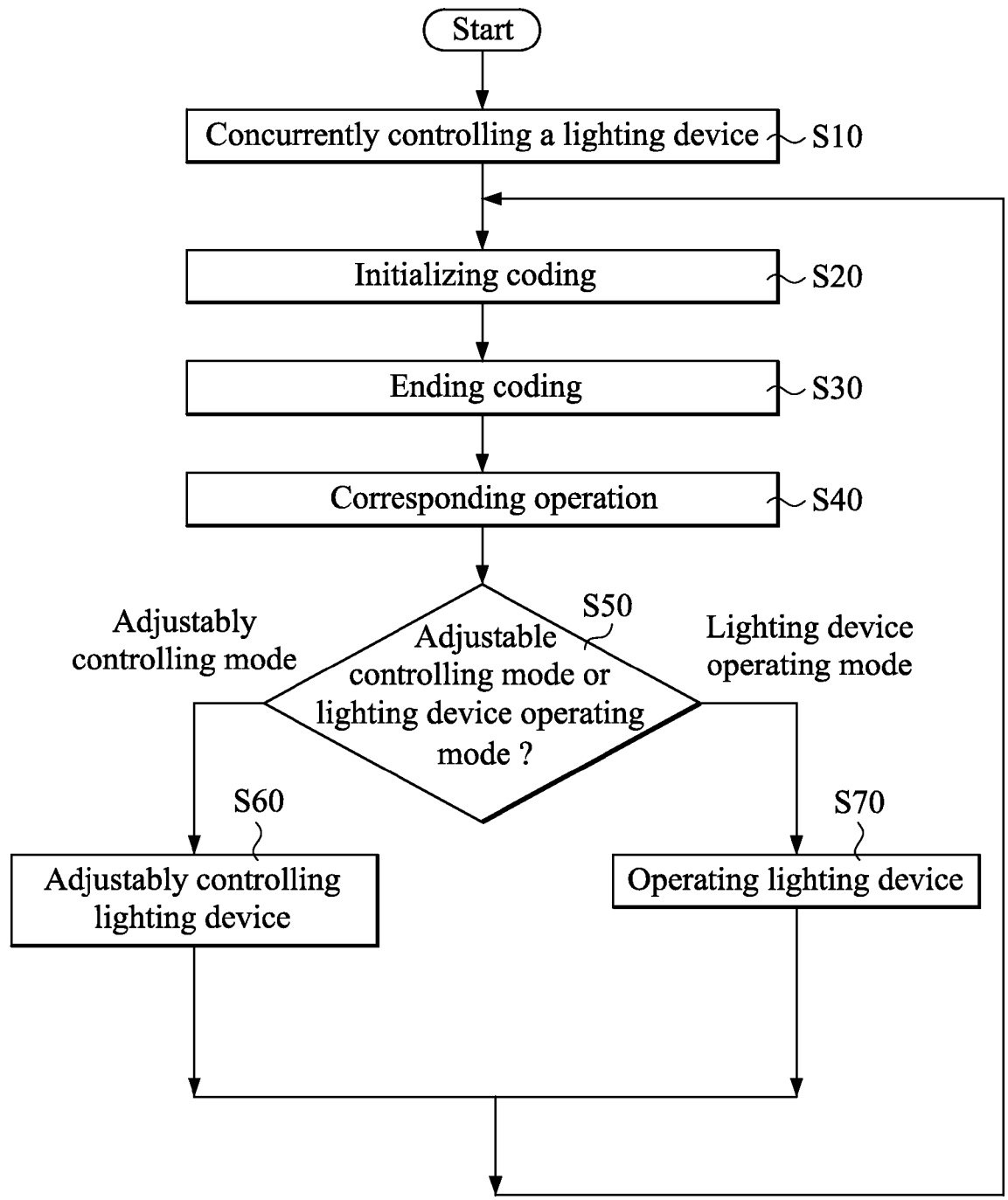
FIG. 1 is a flowchart of a method for adjustably controlling a light according to an embodiment of the present invention.
Figure 2:
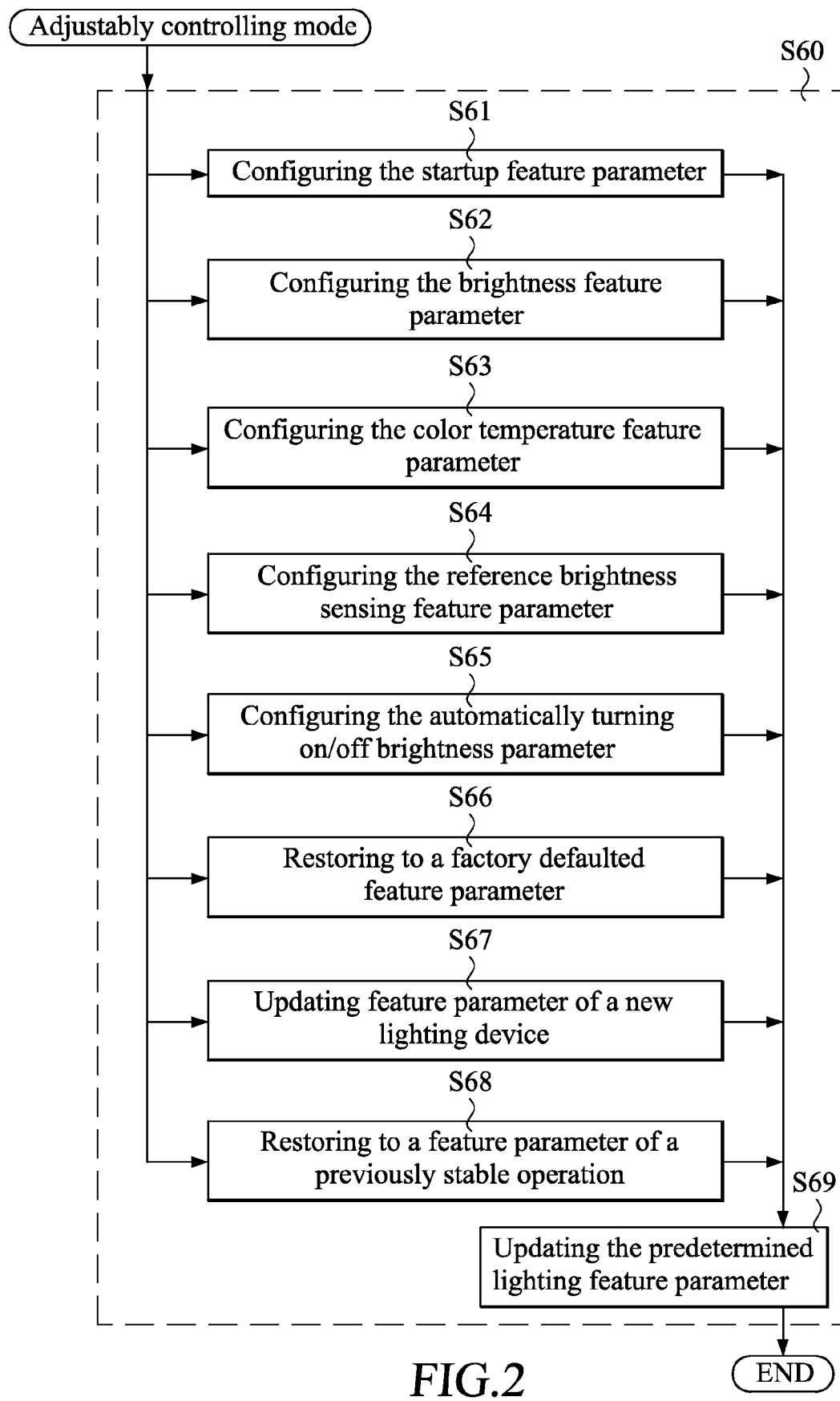
FIG. 2 is a detailed flowchart of a step for adjustably controlling lighting device in the method according to the embodiment of the present invention.
Figure 3:
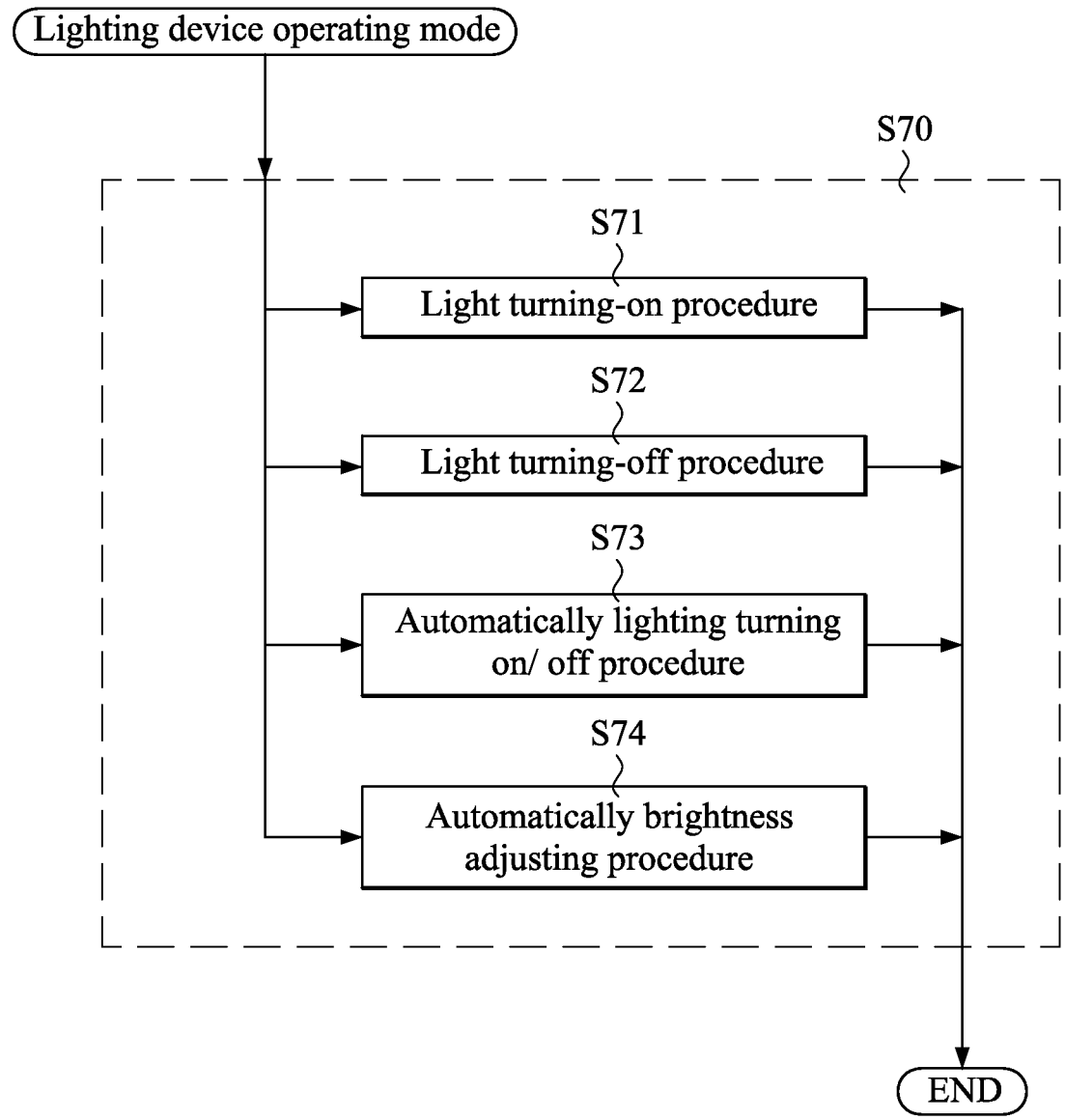
FIG. 3 is a detailed flowchart of a step of operating lighting device in the method according to the embodiment of the present invention.
Figure 4A:
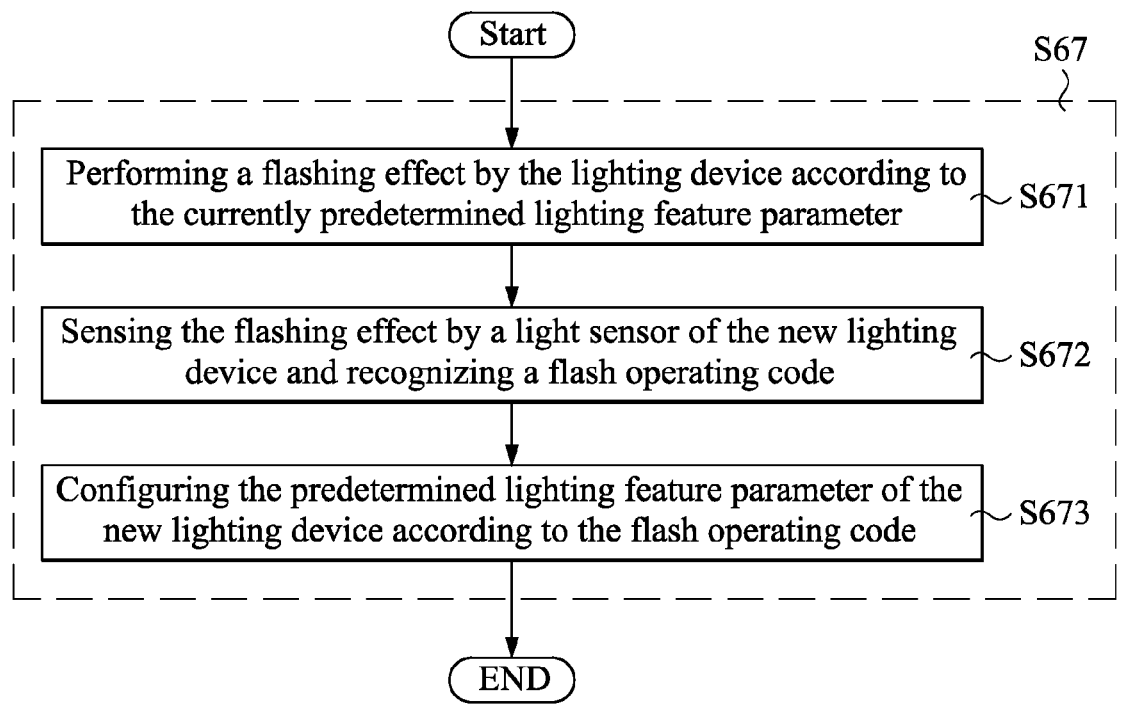
FIGS. 4a and 4b are detailed flowcharts of a step of unifying a lighting feature parameter of a new lighting device in the method according to the embodiment of the present invention.
Figure 4B:
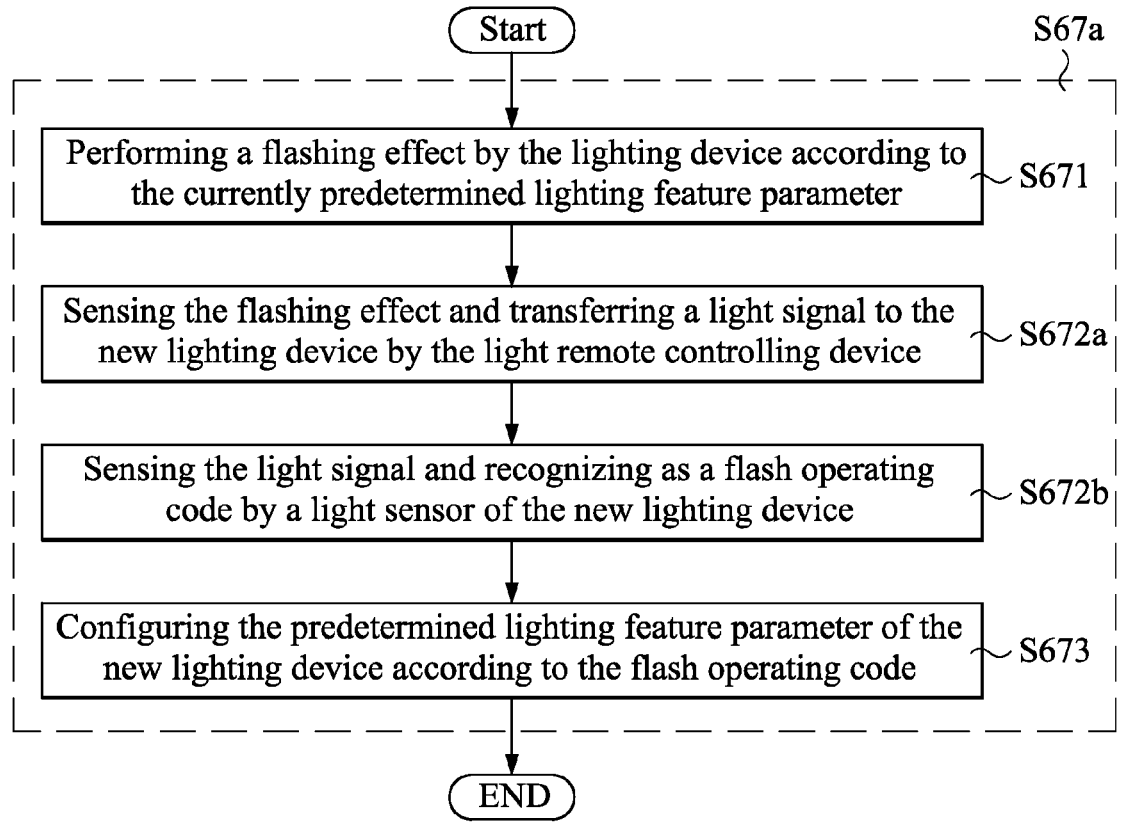
Figure 5:
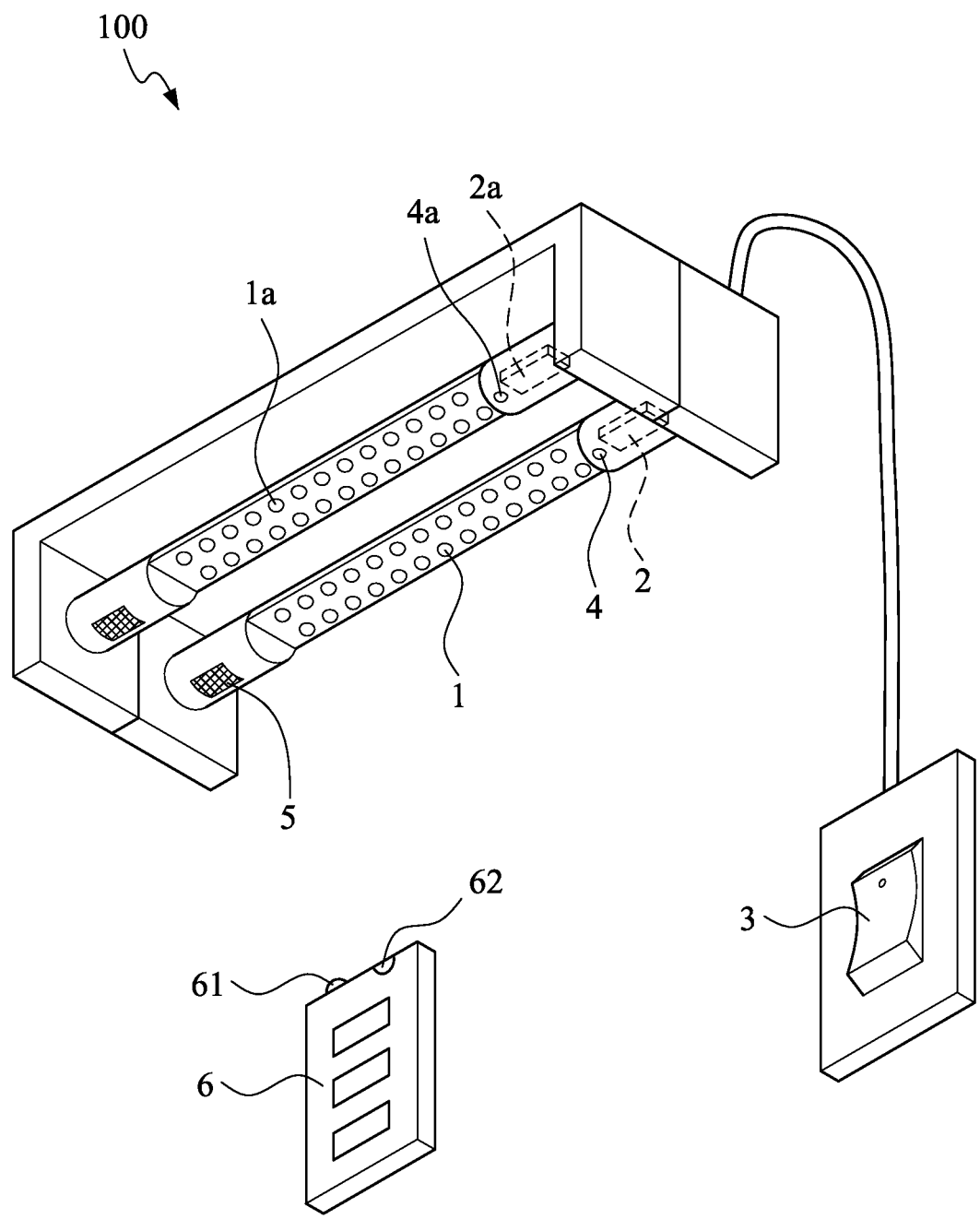
FIG. 5 is a perspective diagram of an apparatus for adjustably controlling a light according to an embodiment of the present invention.
Figure 6:
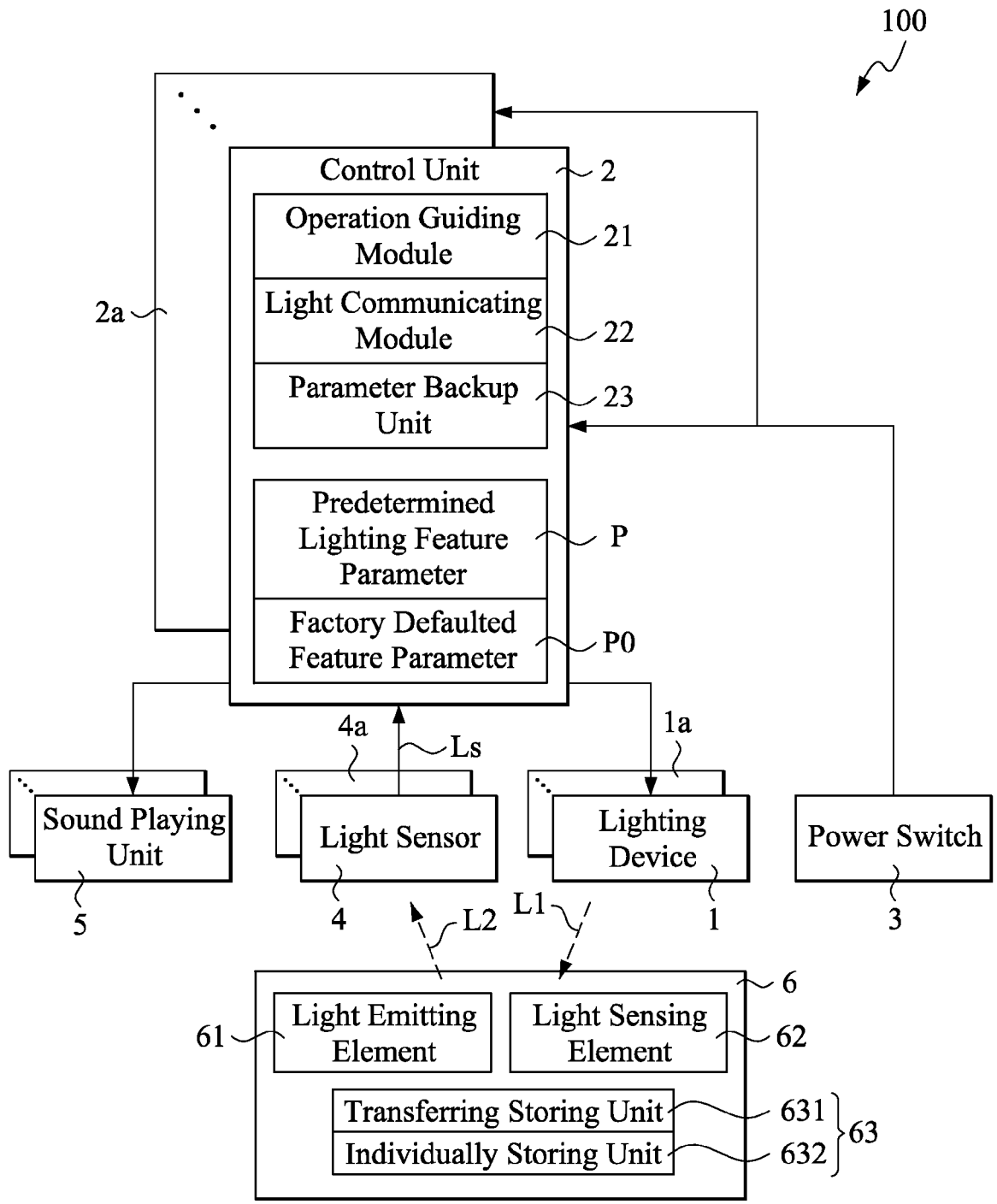
FIG. 6 is a block diagram of the apparatus according to the embodiment of the present invention.
Figure 7:
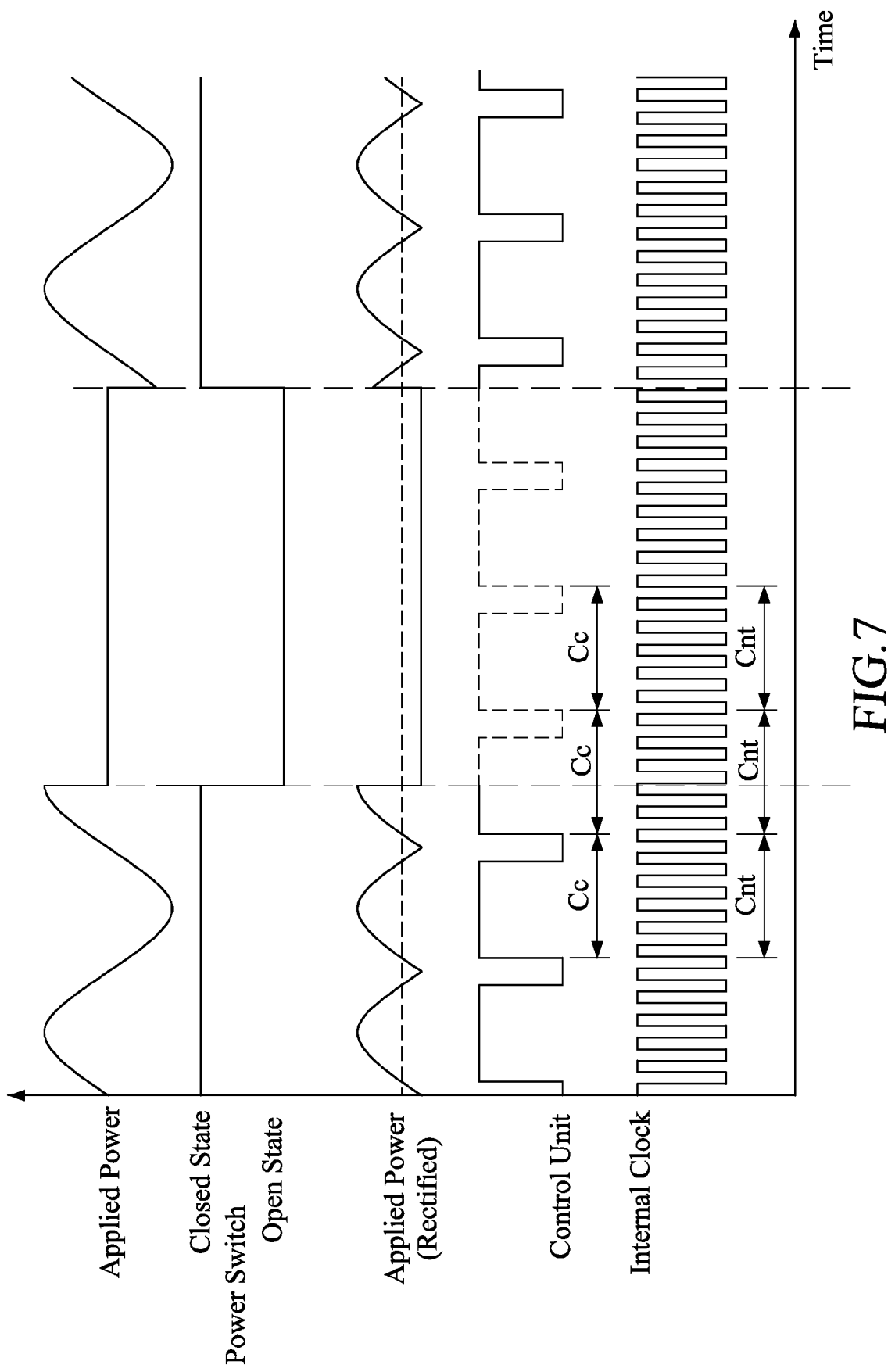
FIG. 7 is a wave profile diagram of the apparatus according to the embodiment of the present invention.
Figure 8:
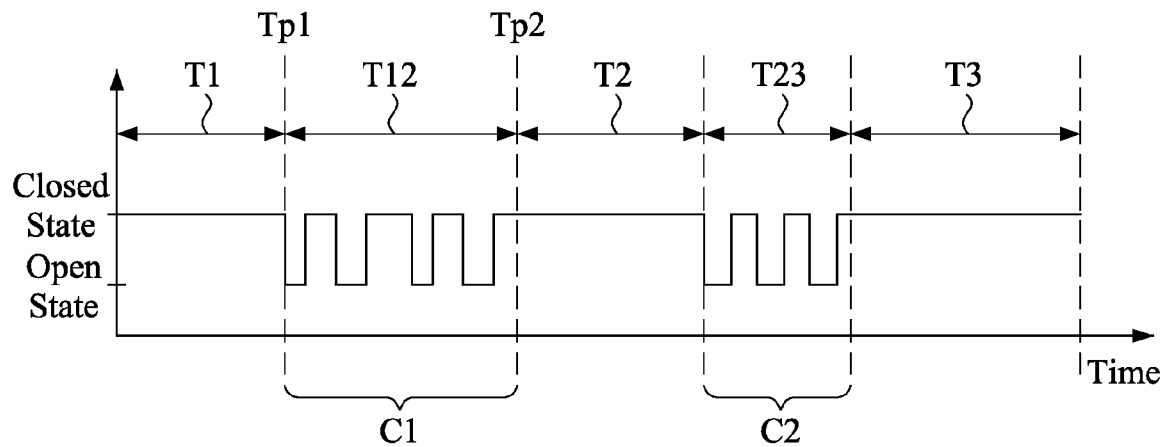
FIG. 8 is a schematic diagram illustrating a switch operating code of the apparatus according to the embodiment of the present invention.
Figure 9:
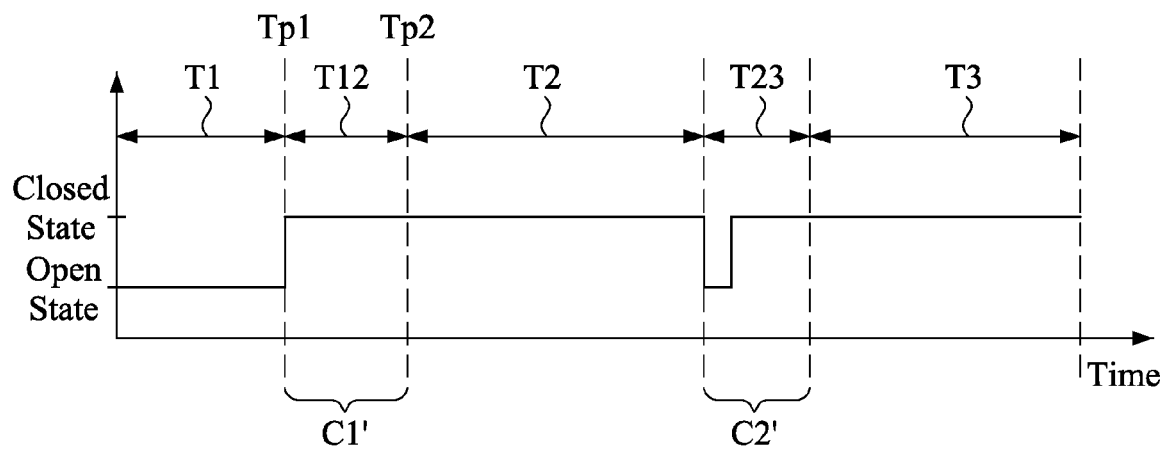
FIG. 9 is another schematic diagram illustrating a switch operating code of the apparatus according to the embodiment of the present invention.
Figure 10:
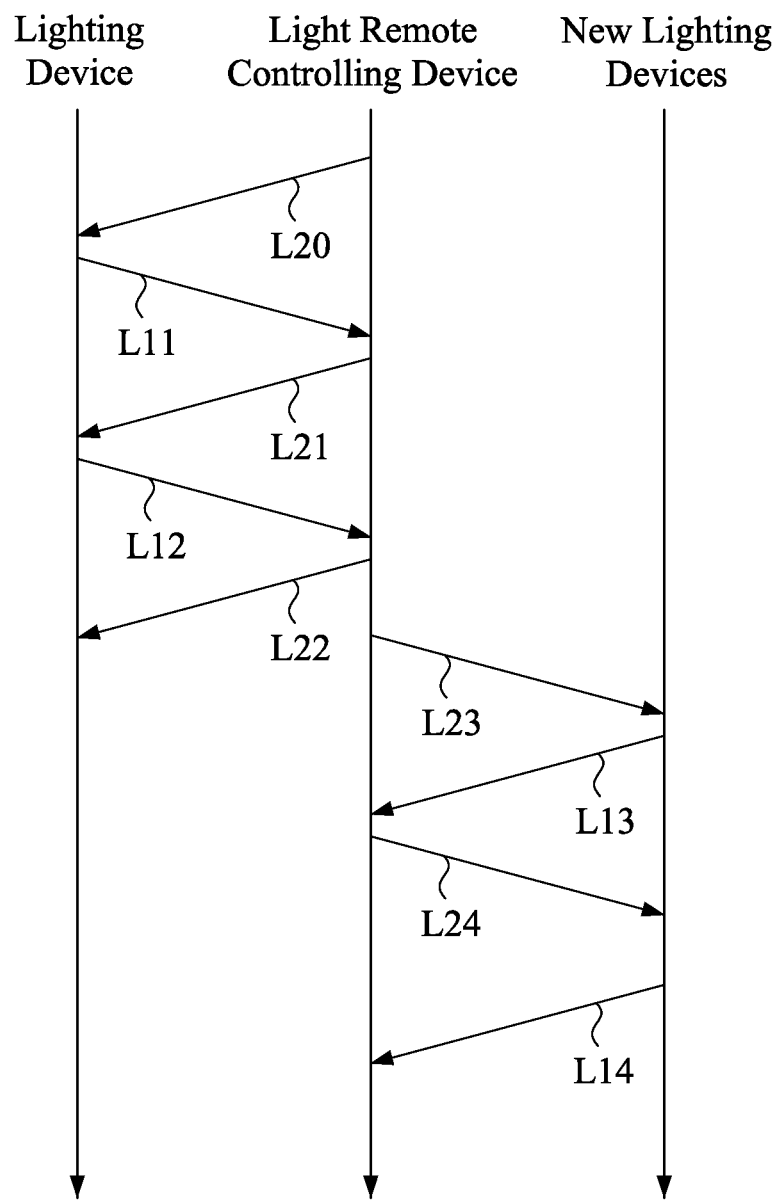
FIG. 10 is a timing diagram illustrating parameter transferring of the apparatus according to the embodiment of the present invention.

Please refer to FIG. 1 to FIG. 10, FIG. 1 is a flowchart of a method for adjustably controlling a light according to an embodiment of the present invention, FIG. 2 is a detailed flowchart of a step for adjustably controlling lighting device in the method according to the embodiment of the present invention, FIG. 3 is a detailed flowchart of a step of operating lighting device in the method according to the embodiment of the present invention, FIGS. 4a and 4b are detailed flowcharts of a step of unifying a lighting feature parameter of a new lighting device in the method according to the embodiment of the present invention, FIG. 5 is a perspective diagram of an apparatus for adjustably controlling a light according to an embodiment of the present invention, FIG. 6 is a block diagram of the apparatus according to the embodiment of the present invention, FIG. 7 is a wave profile diagram of the apparatus according to the embodiment of the present invention, FIG. 8 is a schematic diagram illustrating a switch operating code of the apparatus according to the embodiment of the present invention, FIG. 9 is another schematic diagram illustrating a switch operating code of the apparatus according to the embodiment of the present invention, and FIG. 10 is a timing diagram illustrating parameter transferring of the apparatus according to the embodiment of the present invention.

According to an embodiment of the present invention, a method, which is applied to an apparatus 100, is provided for concurrently tracking and controlling one or more lighting devices 1. The lighting device 1 is connected with a control unit 2 and is provided with at least one power switch 3. Each lighting device 1 is concurrently controlled based on an alternating current frequency/cycle period of an applied power (not shown). General speaking, when the power is applied thereto, the lighting devices 1 are concurrently controlled and are operated based on an alternating current frequency of the applied power or an alternating current cycle period of the applied power. On the other hand, when the power is not applied, the lighting devices 1 are concurrently controlled based on a whole complete alternating current cycle period that is obtained prior to the applied power being off (Step S10). Specifically, as shown in FIG. 7, when a power is applied, the control unit 2 of the lighting device 1 is operated by means of taking the alternating current frequency/cycle period of the applied power as a timing base and using an internal clock of the control unit 2 to count out the alternating current cycle period of the applied power. In a period that the applied power 3 is being cut off by the power switch 3, the control unit 2 of the lighting device 1 uses a counting value Cnt as a timing base, wherein the counting value Cnt is a number of the internal clock cycle within a single whole complete alternating current cycle period Cc. The alternating current cycle period Cc may be obtained, for example, from the last whole complete one of the alternating current cycle period prior to the applied power being off, or from an average/modal cycle period for plural alternating current cycle period when the power is applied. Accordingly, even though the clock rates of the plural control units 2 are different from each other, the quotient of the counting value Cnt of the alternating current cycle period and the clock rates (1000/5 MHz=2000/10 MHz) is a constant for each control units 2. Accordingly, even when the power is not applied, all control units 2 are keep operating by means of an energy storage unit, not shown to concurrently control the respective lighting devices 1 by use of a virtual alternating current cycle period Cc as a timing base that is generated by means of an counting operation as mentioned above. The higher the clock rate of the control unit 2 is, the higher precision can be obtained in a way that the error generated by different clock rates of the control units 2 is not to be generated. Moreover, the above method can be applied for calculating a rated frequency of the applied alternating current source so that the control unit 2 can precisely concurrently control and operate each lighting device 1 for a variety of operations such as a lighting on, a lighting off, an adjustment, a running operation and a parameter transmission. Even though the rated alternating current frequency is changed. Furthermore, a switching operation of the power switch 3 also can be determined by the control unit 2. Thus, all of the lighting devices 1 supplied with the same applied power can operate concurrently and can be concurrently controlled without a necessity of a wired connection thereamong.

In the embodiment, the lighting device 1 is a LED light provided in form of a light tube. However, the invention is not limited to this, and the lighting devices 1 can also be a light bulb, a light panel, or any lighting devices. The control unit 2 is configured to perform one or more adjustable controlling modes and lighting device operating modes, and is provided with one or more predetermined lighting feature parameter P. In the present embodiment, the power switch 3, which is connected between the control unit 2 and the applied power, is a traditional power switch that can be operated in either a "closed" state, meaning that an electrical contacts which allows the electricity to flow through, or an "open" state, meaning the separating of the electrical contacts. Moreover, a light sensor 4 and a sound playing unit 5, which are connected with the control unit 2, are provided.

When a switching operation is performed on the power switch 3, the control unit 2 initializing coding from a time point on which an initial operation is started after the power switch 3 has not been operated continuously for a predetermined continuous non-operating time period (e.g., T0) according to the variation of the applied power (Step S20). Then, the control unit 2 recognizes a combination of the switching operations within a time period of the switching operations as a switch operating code, wherein the time period of switching operations is calculated starting from the initial operation of the starting coding step to a time point that the power switch is continuously not operated for a time period longer than the predetermined continuous non-operating time period (Step S30).

As shown in FIG. 8, the power switch 3 is continuously not operated (e.g., in the closed state) for a time period T1. Since the time period T1 is longer than the predetermined continuous non-operating time period (i.e. T1>T0), the control unit 2 determines that an initial operation of the power switch is started (e.g., in the open state) and initializes coding from the time point Tp1 of the initial operation. Then, after a time point Tp2, since the power switch 3 is continuously not operated (e.g., in the closed state) again for a time period T2, the control unit 2 calculates a time period T12 between the time point Tp1 and the time point Tp2, and recognizes a combination of switching operations within the time period T12 as a switch operating code C1.

The switch operating code C1 can be recognized as different forms with different designs of the control unit 2. For example, the switch operating code C1 may be a natural number determined as a number of times for triggering the power switch 3, e.g., a number of "4", in which it indicates there are 4 times of switching operation into open states or into closed states. For another example, the switch operating code C1 may be a series of connecting states between a high potential (1) and a low potential (0), such as a serial numbers of "010110101". Furthermore, in a simplest case that the power switch 3 is continuously not operated after the initial operation of the power switch is started, such as from the open state to the closed state, a switch operating code C1' can be recognized as a single sign of "0" or "1", as shown in FIG. 9.

After recognizing the switch operating code, the control unit 2 will perform one of adjustable controlling mode of the lighting device 1 and lighting device operating mode corresponding to lighting device operating mode based on the switch operating code C1 (Step S40). Specifically, each of the adjustable controlling modes and the lighting device operating modes of the control unit 2 is referred to at least one corresponding reference code. The control unit 2 compares the switch operating code C1 to the reference codes and thus performs one of the adjustable controlling modes or the lighting device operating mode that is corresponding to the comparing result (Step S50).

When the adjustable controlling mode is performed, the control unit 2 determines a lighting feature parameter of the lighting device 1 and updates the predetermined lighting feature parameter P of the control unit 2 according to the lighting feature parameter that is determined (Step S60). The lighting feature parameter may be a startup feature parameter, a brightness feature parameter, a color temperature feature parameter, a reference brightness sensing parameter, an automatically turning on/off brightness feature parameter, a turning off timing parameter, an ambient temperature feature parameter for automatically adjusting a color temperature according to an ambient temperature, a human sensing feature parameter for correspondingly turning on the lighting device according to a sensed result sensed by a human sensor, and other feature parameters. The control unit is provided with several adjustable controlling modes corresponding to these different lighting feature parameters and performs the adjustable controlling mode determined by the switch operating code C1 for configuring the startup feature parameter (Step S61), configuring the brightness feature parameter (Step S62), configuring the color temperature feature parameter (Step S63), configuring the reference brightness sensing feature parameter (Step S64), configuring the automatically turning on/off brightness parameter (Step S65), restoring to a factory defaulted feature parameter (Step S66), updating feature parameter of a new lighting device (Step S67), restoring to a feature parameter of a previously stable operation (Step S68) and so on.

After configuring the lighting feature parameter, updating the predetermined lighting feature parameter P of the control unit 2 by use of the lighting feature parameter that is configured (Step 69).

As shown in FIG. 8, in the adjustable controlling mode (Step S60), a user can operate another switching operation in relation to the power switch 3. Accordingly, the control unit 2 recognizes a combination of the switching operations within a time period T23 of switching operations as another switch operating code C2, wherein the time period T23 is a time section between two time periods T2, T3 (T2>T0, and T3>T0) which are both longer than the predetermined continuous non-operating time period. Then, the control unit 2 performs another adjustable controlling operation according to the switch operating code C2. For example, the adjustable controlling operation for determining a new lighting feature parameter can be a brighter operation, a darker operation, a color temperature increasing operation, a color temperature decreasing operation, or a parameter directly entering operation. Taking the configuring the startup feature parameter (Step S61) as an example with reference to FIG. 9, the control unit 2 performs a step of configuring the startup feature parameter of the adjustable controlling modes according to the recognized switch operating code Cr. In this case, the control unit 2 controls the lighting device 1 to perform a gradual variation of brightness or color temperature and a user can input, by using the power switch 3, another switch operating code C2' to select a specific brightness and the color temperature to thus update the startup feature parameter. In other case, during the gradual variation of brightness or color temperature of the lighting device 1 is performed, a user can input, by using the power switch 3, another switch operating code to control the lighting device 1 to reverse the gradual variation. Therefore, when the power is applied again to the lighting device 1, the lighting device 1 will be operated according to the updated startup feature parameter of the predetermined lighting feature parameter P. It is noted that, in the adjustable controlling mode, the corresponding relation between the reference codes and the modes of the control unit 2 can be adjusted. In other words, the switch operating code corresponding to the current adjustable controlling mode can be a code with other meaning that is corresponding to the lighting device operating mode in the following configuration. In summary, the switch operating code C1' that is formerly used for configuring the startup feature parameter may be used for a light turning-on procedure of the lighting device operating mode of the lighting device 1.

In addition, in some specific processes of adjustable controlling, it is not necessary to input another switch operating code C2 by the power switch 3 to thus make the operation relatively simpler. As taking the restoration of the factory defaulted feature parameter (Step S66) as an example, it only requires to enter to the adjustable controlling mode, and then the control unit 2 will automatically configure the lighting feature parameter of the lighting device 1 according to a factory defaulted feature parameter PO without the necessity for a user to utilize the power switch 3 for a further operation.

The adjustable controlling is usually suitable for all lighting devices 1. However, when a new lighting device is replaced or is supplemented, a lighting feature parameter of a new lighting device 1a is usually different from the currently predetermined lighting feature parameter P of the lighting device 1 that is existed. Therefore, the step of updating parameter of new lighting device 1a in the adjustable controlling mode is operated (Step S67) for updating a predetermined lighting feature parameter P of the new lighting device 1a in accordance with the currently predetermined lighting feature parameter of the lighting device 1.

The step of updating parameter of new lighting device 1a mainly includes two processes. As referring to FIG. 4, one process is executed by utilizing the lighting device 1 that is adjacent to the new lighting device 1a to update the new lighting device 1a. First, a light communicating module 22 of the control unit 2 controls the lighting device 1 to perform a flashing effect according to the currently predetermined lighting feature parameter P (Step S671). Then, a light sensor 4a of the new lighting device 1a senses the flashing effect, and a light communicating module of a control unit 2a of the new lighting device 1a recognizes a combination of the flashing effect of an outside space, which is sensed by the light sensor 4a within a time period of flashing effect operations, as a flash operating code (Step S672). The process of recognizing the flashing effect as the flash operating code is similar to the process of recognizing the switch operating code as mentioned above. Specifically, the flashing effect is equivalent to the switching between the closed state and the open state of the power switch 3 as mentioned above, and the flash operating code is recognized by the control unit 2 according to a flashing frequency, a flashing interval time, and a flashing duty cycle. Moreover, the outputting and the sensing of the flashing effect between the lighting device 1 and the new lighting device 1a are concurrent based on the same alternating current frequency or the same alternating current cycle period of the applied power. Afterwards, the control unit 2a configures the predetermined lighting feature parameter of the new lighting device 1a according to the flash operating code (Step S673).

Alternatively, as referring to FIG. 4b, another process is executed by utilizing a light remote controlling device 6 for transferring. The light remote controlling device 6 includes a light emitting element 61, a light sensing element 62, and a memory element 63. The memory element 63 includes a transferring storing unit 631 and an individually storing unit 632. Specifically, one or more than one individually storing unit 632 may be provided. First, the light communicating module 22 of the control unit 2 controls the lighting device 1 to generate a light signal L1 containing the flashing effect according to the predetermined lighting feature parameter P (Step S671). Afterwards, the light sensing element 62 of the light remote controlling device 6 senses the light signal L1, which contains the flashing effect. And then the light emitting element 61 of the light remote controlling device 6 transfers a light signal L2, which contains the flashing effect, to the new lighting device 1a (Step S672a). Specifically, when it is operated in the transferring, the light remote controlling device 6 converts the light signal L1, which contains the flashing effect and is sensed by the light sensing element 62, to a data. And the data is stored in the transferring storing unit 631 so that the light emitting element 61 transfers the predetermined lighting feature parameter through the light signal L2 to any new lighting devices 1a according to the stored data. Then, the light sensor 4a of the new lighting device 1a senses the light signal L2, and the control unit 2a recognizes the light signal L2 as the flash operating code. Next, the control unit 2a configures the predetermined lighting feature parameter of the new lighting device 1a according to the flash operating code (Step S673). As referring to FIG. 10 which shows a detailed process, the remote controlling device 6 sends a requesting light signal L20 to the lighting device 1 that is existed. The lighting device 1 receives the requesting light signal L20 and responds a concurrent light signal L11 to the remote controlling device 6. Because the remote controlling device 6 is not electrically connected with the applied power of the lighting device 1, the lighting devices 1 are unable to be concurrent based on the alternating current frequency of the applied power or the alternating current cycle period of the applied power. By the above scheme, the lighting devices 1 becomes able to be concurrently adjusted by this specific form of concurrent light signal L11. The remote controlling device 6 receives the concurrent light signal L11 for adjusting itself to be concurrent to the lighting device 1 and responds a confirming light signal L21 to the lighting device 1. Then, the lighting device 1 transfers the predetermined lighting feature parameter in a predetermined transmission format of a light data signal L12 to the remote controlling device 6. The remote controlling device 6 receives and stores the light data signal L12 and responds a completed light signal L22 to the lighting device 1. The completed light signal L22 is used for confirming the transfer is completed and may be used as a Cyclic Redundancy Check (CRC) code for verifying whether or not it is a correct transmission. Next, the remote controlling device 6 transfers a parameter to the new lighting device 1a with a similar process as mentioned above. The sequence of the processes is: the remote controlling device 6 sends a requesting light signal L23 to the new lighting device 1a, and the new lighting device 1a responds a concurrent light signal L13, and then the remote controlling device 6 sends a light data signal L24, and then the new lighting device 1a responds a completed light signal L14 to the remote controlling device 6, and thus the transfer is completed. The remote controlling device 6 can be any kinds of the mobile electronic device, such as a mobile phone, a tablet computer, etc., which can use its LED lights or backlights of its display as the light emitting element and use its panel brightness sensor as the light sensing element.

The remote controlling device 6 is not only be used for transferring but also can be used for adjustable controlling a selected lighting device 1. Specifically, the remote controlling device 6 sends the light signal L2, which is predetermined, by the light emitting element 61, to the light sensor 4 of a selected lighting device 1, and senses the light signal containing the flashing effect. By means of this signal handshake, the remote controlling device 6 is adjusted to be concurrent with the lighting device 1 and further sends an adjustably controlling order to the lighting device 1 by the light signal L2. The light communicating module 22 recognizes a combination of the flashing effects from the outside space sensed by the light sensor within the time period of flashing effect operations as the flash operating code and adjustable controls the selected lighting device 1 according to the flash operating code. In the process of adjustable controlling by means of the remote controlling device 6, the remote controlling device 6 stores the parameter used for adjustable controlling the individually storing unit 632. In a case that multiple individually storing units 632 are provided, there are parameters corresponding to the plural lighting devices 1 being memorized.

The adjustable controlling mode may include a step of restoring a previously stable operation parameter (Step S68). Normally, the control unit 2 automatically backups the predetermined lighting feature parameter P which has been stably used for a time period in a parameter backup unit 23. In the event that the lighting devices 1 are concurrently out of order, or the parameter is confusing due to a power failure or an improper operation, the predetermined lighting feature parameter, which is incorrect, will be restored to the predetermined lighting feature parameter of the previous stable state that has been automatically backuped, and thus the lighting devices 1 is restored to normal.

In the embodiment, the control unit 2 further includes an operation guiding module 21. When it is operated in the adjustable controlling mode, the operation guiding module 21 of the control unit 2 controls the lighting device 1 to perform different flashing effects according to the configuration in the adjustable controlling mode. The flashing effect includes a twinkle flash within a predetermined time period, a predetermined times for a twinkle flash, a gradual brightness and a gradual darkness. Alternatively, the operation guiding module 21 of the control unit 2 controls the sound playing unit 5 to perform different sound effects according to different configurations in the adjustable controlling modes, such as a music, a ringtone or a voice. Therefore, it enables the users to easily understand now what adjustable controlling modes are so as to operate correctly and easily.

As referring back to FIG. 1, when it is operated in the lighting device operating mode, the control unit 2 controls the lighting device 1 to execute an operation of a lighting device according to the predetermined lighting feature parameter P which is existing or has been updated in the adjustable controlling mode (Step S70). The operation of a lighting device may include a light turning-on procedure, a light turning-off procedure, an automatically brightness adjusting procedure, and an automatically lighting turning on/off procedure. These procedures are based on correspondingly predetermined lighting feature parameter for operating the lighting device 1.

For example, when it is operated in the light turning-on procedure (Step S71), the control unit 2 turns on the lighting device 1 according to the brightness parameter and/or the color temperature of the predetermined lighting feature parameter P. Even though the lighting features of the lighting device 1, such as brightness and color temperature, have been adjusted after the lighting device 1 is turned on, the lighting device 1 will be with the same lighting features as the predetermined lighting feature parameter P in the next turn on if the predetermined lighting feature parameter P is not be updated in the adjustable controlling mode of the lighting device. Moreover, when it is operated in the light turning-off procedure (Step S72), the control unit 2 turns off the lighting device 1 according to the predetermined lighting feature parameter P. For example, the light turning-off procedure may be a delay turning off in which it will automatically turn off the lighting device 1 after a predetermined time period.

In the automatically lighting turning on/off procedure (Step S73), when a brightness of outside space Ls sensed by a light sensor is within a range defined by an automatically turning on/off brightness parameter of the predetermined lighting feature parameter, the control unit 2 will automatically turn the lighting device 1 to be on or off. In the embodiment, the light sensor 4 is provided as being proximate to the lighting device 1 and is connected with the control unit 2 as well for sensing a brightness of outside space Ls. Accordingly, the lighting device 1 can be automatically turned on at night and can be automatically turned off in a daytime so that the lighting device 1 is not only suitable for a door light, a garden light, and a balcony light but also can be used for the purpose of anti-theft or theft frightening.

In the automatically brightness adjusting procedure of Step S73, the control unit 2 adjusts a light output of the lighting device 1 in accordance with a brightness difference which is obtained by comparing a brightness defined by a reference brightness sensing parameter of the predetermined lighting feature parameter P and a brightness of the outside space Ls sensed by the light sensor 4 in such a way that an illuminating intensity of a covering space of the lighting device 1 can be within a range of predetermined illuminating intensity. Specifically, when the brightness of outside space Ls sensed by a light sensor 4 is insufficient, the control unit 2 accordingly increases the brightness output of lighting device 1. In contrast, when the brightness of outside space Ls sensed by a light sensor 4 is too high, the control unit 2 accordingly reduces the brightness output of lighting device 1. Thus, the illuminating intensity of a covering space of the lighting device 1 is within a range of predetermined illuminating intensity. The brightness defined by the reference brightness sensing parameter, which is used as compared with the brightness of outside space Ls sensed by the light sensor 4, is a reference value used by the control unit 2 for adjusting a sensed value of the light sensor 4. For example, the control unit 2 gradually adjusts the light output of lighting device 1 according to a value obtained by subtracting the reference brightness sensing parameter from the brightness of outside space Ls step by step until the value is zero or is approximating to zero. Therefore, the light output of lighting device 1 is increased or reduced by following the different values of reference brightness sensing parameter in a wary that the illuminating output of the lighting device 1 and a covering space thereof become higher or lower.

The process of adjusting the illuminating intensity of a covering space of the lighting device 1, by means of the reference brightness sensing parameter, can be used to replace a conventional process that adjusts the sensed value by a sheltering of a light transmission window element. Thus, it eliminates the costs for installing the light transmission window element to achieve an adjustment with a safer and more convenient way. Moreover, in the apparatus 100 according to the embodiment of the present invention, the sensed value of the light sensor 4 is the actual brightness of outside space Ls that is not affected by the light transmission window element, and thus the single light sensor 4 in the automatically brightness adjusting procedure also can also be used as the same element in a procedure of automatically lighting turning on/off and a procedure of updating feature parameter of the new lighting device in the adjustable controlling mode. Therefore, it reduces component costs and installation space.

By the method for adjustably controlling a light as above, even though the switch power 3 has been operated repeatedly, an accumulated timing error of the control unit 2 will not be occurred, and one or more lighting device 1 will still be concurrent. A user can operate a specific switching operation by means of the power switch 3, and the control unit 2 recognizes the switching operation as a switch operating code to thus simply achieve purposes of adjustably controlling the lighting feature parameter, of mode selecting, and of operation according to the predetermined lighting feature parameter. As compared to a conventional method of adjusting lighting device that is gradually adjusted for every period of time section, the coding process provided by the present invention can generate a more concrete code within a shorter time so that it can be simply applies to expand more kinds of modes, and the configurations can be adjusted by correspondingly switching operation of the power switch 3 to thereafter obtain a more comfortable lighting and customized lighting result. Furthermore, by the apparatus of the present invention, a multifunction controlling can be implemented by an existing power switch 3 without a necessity of changing the circuit wiring arrangement, and thus it is not only easy for an implementation of a user but also significantly reduces the construction costs.

The above description should be considered as only the discussion of the preferred embodiments of the present invention. However, a person skilled in the art may make various modifications to the present invention. These modifications still fall within the spirit and scope defined by the appended claims.

What is claimed is:

1. A method for adjustably controlling a light by concurrently tracking and controlling one or more lighting devices to which a control unit is connected and by which at least one power switch is provided, wherein the control unit is provided with one or more predetermined lighting feature parameters, the method comprises:
   (a) a step of concurrently controlling a lighting device for concurrently controlling and operating each lighting device, when a power is applied, based on an alternating current frequency of the applied power or an alternating current cycle period of the applied power, and for concurrently controlling and operating each lighting device, when the power is not applied, based on a whole complete alternating current cycle period that is obtained prior to the applied power being off;
   (b) a step of initializing coding for initializing coding from a time point on which an initial operation of the power switch is started after the power switch has not been operated continuously for a predetermined continuous non-operating time period;
   (c) a step of ending coding for recognizing a combination of switching operations within a time period of switching operations as a switch operating code, wherein the time period of switching operations is calculated starting from the time point on which an initial operation of the power switch is started to a time point on which the power switch is continuously not operated for a time period longer than the predetermined continuous non-operating time period;
   (d) a step of corresponding operation for performing, by means of the control unit, an adjustable controlling mode of a lighting device or an operation corresponding to a lighting device operating mode based on the coding of the power operation;
   (e) a step of adjustably controlling lighting device for determining a lighting feature parameter of the lighting device and updating the predetermined lighting feature parameter of the control unit by use of the predetermined lighting feature parameter when it is operated in the adjustable controlling mode of the lighting device, wherein the lighting feature parameter includes a brightness feature parameter or a color temperature feature parameter; and
   (f) a step of operating lighting device for executing, by means of the control unit, an lighting device operating procedure according to the predetermined lighting feature parameter when it is operated in the operating mode of the lighting device, wherein the lighting device operating procedure includes a light turning-on procedure and a light turning-off procedure.

2. The method as claimed in claim 1, wherein the step (a) further includes a step of determining a rated alternating current frequency of the applied power in such a way that the adjustable controlling and operating of each lighting device is adjusted in accordance with the rated alternating current frequency of the applied power.

3. The method as claimed in claim 1, wherein, in the step (a), the whole complete alternating current cycle period is obtained from an average period or a modal period of the plural alternating current cycle period of the power device in a time point prior to the applied power being off.

4. The method as claimed in claim 1, wherein, in the step (c), the combination of switching operations within the time period of switching operations is a combination of items selected from a group including a switching frequency, a switching interval time, and a switching duty cycle.

5. The method as claimed in claim 1, wherein the step (e) further includes a step of recognizing, by means of the control unit, a combination of the switching operations of the power switch within another time period of switching operation as another switch operating code, and performing a corresponding adjustable controlling operation according to another switch operating code.

6. The method as claimed in claim 1, wherein, in the step (e), the lighting feature parameter includes a startup feature parameter.

7. The method as claimed in claim 1, wherein the step (e) includes a step of configuring, by means of the control unit, the lighting feature parameter of the lighting device to a factory defaulted feature parameter to thus restoring the predetermined lighting parameter to the factory defaulted feature parameter.

8. The method as claimed in claim 1, wherein at least one step between the step (d) and the step (e) further includes: controlling, by means of the control unit, the lighting device to perform different flashing effects according to the different adjustable controlling mode for the light device, wherein the flashing effect includes a twinkle flash within a predetermined time period, a predetermined times for a twinkle flash, a gradual brightness and a gradual darkness.

9. The method as claimed in claim 1, wherein at least one step between the step (d) and the step (e) further includes: controlling, by means of the control unit, a sound playing unit to perform different sound effects according to different adjustable controlling modes.

10. The method as claimed in claim 1, wherein the step (f) further includes a step of enabling the lighting device operating procedure to be an automatically brightness adjusting procedure, wherein the automatically brightness adjusting procedure is for adjusting a light output of the lighting device in accordance with a brightness difference obtained by a control unit by which a brightness defined by a reference brightness sensing feature parameter of the predetermined lighting feature parameter and an outside space sensed by a light sensor are compared so as enable an illuminating intensity of a covering space of the lighting device to be within a range of predetermined illuminating intensity.

11. The method as claimed in claim 1, wherein the step (f) further includes a step of enabling the lighting device operating procedure to be an automatically lighting turning on/off procedure, wherein the automatic lighting turning on/off procedure is for enabling the control unit to control the lighting device to be turned on or turned off when a outside space sensed by a light sensor is within a range defined by an automatically turning on/off brightness parameter of the predetermined lighting feature parameter.

12. The method as claimed in claim 1, wherein the step (e) further includes a step of updating a predetermined lighting feature parameter of a new lighting device in accordance with the currently predetermined lighting feature parameter of the lighting device.

13. The method as claimed in claim 12, wherein in the step (e) the step of updating the predetermined lighting feature parameter of a new lighting device includes the steps of:
  controlling the lighting device to perform a flashing effect according to the currently predetermined lighting feature parameter;
  sensing, by means of a light sensor of the new lighting device, the flashing effect in such a manner that a flashing operation code is recognized by a control unit of the new light device; and
  configuring, by means of the control unit of the new lighting device, the predetermined lighting feature parameter of the new lighting device according to the flashing operation code.

14. The method as claimed in claim 12, wherein, in the step (e) of updating a predetermined lighting feature parameter of a new lighting device includes the steps of:
  controlling the lighting device to perform a flashing effect according to the currently predetermined lighting feature parameter;
  sensing, by means of a light remote controlling device, the flashing effect in such a manner that a light signal containing the flashing effect is transmitted to the new lighting device;
  sensing, by means of a light sensor of the new lighting device, the light signal in such a manner that a flashing operation code is recognized by a control unit of the new lighting device; and
  configuring the predetermined lighting feature parameter of the new lighting device according to the flashing operation code.

15. An apparatus for adjustably controlling a light by concurrently tracking and controlling one or more lighting devices, wherein each lighting device is concurrently controlled and operated by means of an alternating current frequency of a applied power or an alternating current cycle period of a applied power when the power is applied, and is concurrently controlled and operated by means of a whole complete alternating current cycle period that is obtained prior to the applied power being off when the power is not applied, the apparatus comprises:
  a lighting device;
  at least one control unit connected with the lighting device, the control unit being operated in one or more adjustably controlling modes and one or more operating modes, and being provided with one or more predetermined lighting feature parameters; and
  at least one power switch connected between the control unit and the applied power unit;
  wherein the control unit determines an initializing coding operation starting from a time point on which an initial operation is started after the power switch has not been operated continuously for a predetermined continuous non-operating time period and recognizes a combination of switching operations within a time period of switching operations as a switch operating code, wherein the time period of switching operations is calculated starting from the time point on which an initial operation of the power switch is started to a time point on which the power switch is continuously not operated for a time period longer than the predetermined continuous non-operating time period, and performs the adjustable controlling mode or the operating mode of a corresponding operation to a lighting device based on the coding of the power operation;
  wherein when it is operated in the adjustable controlling mode of the lighting device, the control unit determines a lighting feature parameter of the lighting device and updates the predetermined lighting feature parameter of the control unit by use of the predetermined lighting feature parameter, in which the lighting feature parameter includes a brightness feature parameter or a color temperature feature parameter; and
  wherein when it is operated in the operating mode of the lighting device, the control unit controls the lighting device to execute a lighting device operating procedure according to the predetermined lighting feature parameter, in which the lighting device operating procedure includes a light turning-on procedure and a light turning-off procedure.

16. The apparatus as claimed in claim 15, wherein the control unit further includes a parameter backup unit.

17. The apparatus as claimed in claim 15, wherein the control unit further includes an operation guiding module, for controlling the lighting device to perform different flashing effects according to the configuration in the adjustable controlling mode, wherein the flashing effect includes a twinkle flash within a predetermined time period, a predetermined times for a twinkle flash, a gradual brightness and a gradual darkness.

18. The apparatus as claimed in claim 15, further including a light sensor for sensing an outside space, wherein the light sensor is provided as being proximal to the lighting device and is connected with the control unit.

19. The apparatus as claimed in claim 18, wherein the control unit further includes a light communicating module, for communicating with an external device by utilizing a combination of a flashing effects from the outside space sensed by the light sensor and by controlling the lighting device to perform the flashing effect.

20. The apparatus as claimed in claim 19, further including a light remote controlling device provided with a light emitting element, a light sensing element, and a memory element, wherein the light emitting element emits a light signal containing a combination of a predetermined flashing effect to the light sensing element, and the light sensing element senses the combination of a flashing effect of the lighting device to remotely control the lighting device.

* * * * *